United States Patent
Momozono et al.

(10) Patent No.: US 7,391,743 B2
(45) Date of Patent: Jun. 24, 2008

(54) NETWORK SYSTEM

(75) Inventors: Yukinobu Momozono, Nagano (JP); Yuji Matsueda, Nagano (JP); Satoshi Iinuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 568 days.

(21) Appl. No.: 11/012,581

(22) Filed: Dec. 14, 2004

(65) Prior Publication Data

US 2005/0147091 A1    Jul. 7, 2005

(30) Foreign Application Priority Data

Dec. 15, 2003    (JP)    ............................ P2003-417213

(51) Int. Cl.
   *H04L 12/28*    (2006.01)
   *H04L 12/66*    (2006.01)
   *G06F 15/00*    (2006.01)

(52) U.S. Cl. .................... 370/254; 370/356; 370/389; 370/392; 370/400; 358/1.14; 709/227

(58) Field of Classification Search .................. None
   See application file for complete search history.

(56) References Cited

U.S. PATENT DOCUMENTS

| | | | | |
|---|---|---|---|---|
| 6,654,137 | B1 * | 11/2003 | Yagita | 358/1.15 |
| 7,088,461 | B2 * | 8/2006 | Miyano | 358/1.14 |
| 7,209,250 | B2 * | 4/2007 | Nakao | 358/1.15 |
| 7,215,437 | B2 * | 5/2007 | Shima | 358/1.15 |
| 7,227,664 | B2 * | 6/2007 | Kato et al. | 358/1.15 |
| 7,260,637 | B2 * | 8/2007 | Kato | 709/227 |

FOREIGN PATENT DOCUMENTS

| | | |
|---|---|---|
| JP | 09-162887 | 6/1997 |
| JP | 2002-157177 | 5/2002 |

\* cited by examiner

*Primary Examiner*—Melanie Jagannathan
(74) *Attorney, Agent, or Firm*—Hogan & Hartson LLP

(57) ABSTRACT

The system is a combination of a network device having a feature to transmit to an administration device information including the IP address of the device at power on and an administration device having a feature to automatically register the administration information concerning the network device which has transmitted the information based on the received information.

3 Claims, 8 Drawing Sheets

NETWORK SYSTEM

BACKGROUND OF THE INVENTION

The present invention relates a network system where a plurality of network devices and an administration device which is required to store the IP addresses of the plurality of devices are interconnected in a network.

Recently, among the digital multifunction devices available on the market is a network system schematically shown in FIG. 7, that is, a digital multifunction device capable of implementing a network system comprising a plurality of digital multifunction devices 110, a scan agent computer 150, an internet router 160, a file server 170, and an administrator's computer 180.

The internet router 160 included in the network system is a device for connecting each computer in the network system to the Internet. The file server 170 is a computer where a folder is set which is capable of writing a file. The administrator's computer 180 is a computer used by the administrator of the network system (mainly the digital multifunction device 110 and the scan agent computer 150). That is, these devices are devices having ordinary features alone (typically included in a general LAN).

The scan agent computer 150 is a computer in which is installed a scan agent program 140 developed for the digital multifunction device 110. The scan agent program 140 is a so-called memory-resident program. The powered-on scan agent computer 150 (on which the scan agent program 140 is running) functions as a device for creating a file of image data transmitted from the digital multifunction device 110, or image data generated by a scanner in the digital multifunction device 10, to store the file in the file server 170 as well as transmitting an e-mail where the image data transmitted from the digital multifunction device 110 is attached.

In short, the scan agent program 140 is a program which must be installed in a computer on a LAN to which the digital multifunction device 110 is connected in order to cause the digital multifunction device 110 to work as a device capable of performing the processes of creating a file of image data of a manuscript set on a scanner to store the file in the files server and transmitting an e-mail where the image data of a manuscript set on the scanner is attached (these processes are hereinafter referred to as scan data transmit processes).

The digital multifunction device 110 and the scan agent program 140 require cumbersome setting work in starting the operation.

The procedure to be followed when starting the digital multifunction device 110 will be described taking as an example a case where a network system shown in FIG. 6 (the system including two digital multifunction devices 110) is implemented. In the following description, it is assumed that setting of an IP address to the scan agent computer 150 is complete. The IP address assigned to the scan agent computer 150 is hereinafter referred to as an agent IP address.

In this case, the administrator of the network system (or a person who installs the digital multifunction device 110) performs device address setting work as being work of setting an IP address (hereinafter referred to as a device address) to one digital multifunction device 110 (hereinafter referred to as Digital Multifunction Device A). After that, the administrator performs device address setting work to the other digital multifunction device 110 (hereinafter referred to as Digital Multifunction Device B). The IP address setting work is work which requires operation on an operation panel provided on the Digital Multifunction Device B, that is, work which needs to be done at a location where the digital multifunction device 110 is installed.

Next, the administrator operates an administrator's computer or another computer on the LAN to display a web page used to register the digital multifunction device retained by the scan agent computer 150 on the display of the administrator's computer 180. The web page includes a column for entering an administration name concerning the digital multifunction device to be registered and the IP address, and a registration button to instruct registration. The administrator enters an administration name determined for Digital Multifunction Device A and the IP address of Digital Multifunction Device A on the web page, and presses the registration button.

When such work ("Device address/administration name registration on Multifunction Device A" in FIG. 7) is done, information including the administration name and IP address entered by the administrator is transmitted from the administrator's computer 180 to the scan agent computer 150.

The scan agent computer 150 (scan agent program 140), receiving the information, performs address notification processing whereby the device (Digital Multifunction Device A in this case) assigned an IP address included in the information is notified of an agent IP address (IP address assigned to the computer). The scan agent computer 150, receiving information indicating that the agent IP address has been received from Digital Multifunction Device A, "acknowledge OK"), performs administration information registration processing whereby the administration information including the administration name and device IP address entered by the administrator is internally stored.

When this administration information registration processing is complete, a web page indicating that is displayed on the administrator's computer 180 (not shown in FIG. 7). The administrator operates the administrator's computer 180 to perform the same work on Multifunction Device B as that for Multifunction Device A.

As understood from the foregoing description, when operation of the digital multifunction device 110 is started (when installation of the digital multifunction device 110 is started), the administrator must perform setting of the digital multifunction device 110 and setting of the administrator's computer 180. The administrator's computer 180 (or a computer capable of setting the scan agent computer 150) is not necessarily installed near the digital multifunction device 110, so that the work to be done by the administrator at the start of operation of the digital multifunction device 110 is rather cumbersome.

When the layout of an office is changed, IP addresses of several digital multifunction device 110 must be changed. In this network system, in such a case, the IP address of the digital multifunction device 110 must be first changed and modification to the administration information concerning the digital multifunction device 110 (IP address included in the administration information) must be made for the scan agent computer 150. Further, the network system is a system which involves cumbersome installation in that a unique administration name of each digital multifunction device 110 must be determined.

SUMMARY OF THE INVENTION

The invention has as an object to provided a network system comprising one or more network devices (digital multifunction device 110) and an administration device (scan agent computer 150) into which the IP address of each network device must be stored, the network system allowing easy initial setting of each network device.

(1) In order to solve the aforesaid object, the invention is characterized by having the following arrangement.

(1) A network system in which an administration device and one or more network devices are interconnected via a network, wherein each of the one or more network devices comprises:

an IP address storage that stores an administration device IP address as an IP address of the administration device set to the device, and an device IP address as an IP address of the device; and a device IP address-containing information transmitter that, when the device is powered, transmits device IP address-containing information, which include the device IP address and other information concerning the device stored in the IP address storage, to a device to which the administration device IP address stored into the IP address storage is assigned, and wherein the administration device comprises:

an administration information storage that is capable of storing a plurality of administration information items including the device IP address;

administration information adding unit that stores administration information corresponding to the received device IP address-containing information into the administration information storage in the case that the administration information corresponding to the device IP address-containing information is not stored in the administration information storage when the device IP address-containing information is received; and a specific-target processor that performs predetermined processing on the network device alone to which the device IP address included in each administration information item stored in the administration storage is assigned.

(2) The network system according to (1), wherein the device IP address-containing information transmitter transmits the device IP address-containing information including the device IP address, a MAC address of the device, and a model name of the device, the administration information storage transmits administration information including the device IP address, the MAC address and the model name included in the device IP address-containing information, and the administration information storage stores the administration information corresponding to the received device IP address-containing information into the administration information storage, in case the administration information containing the same MAC address as that in the received device IP address-containing information is not stored in the administration information storage, and overwrites the device IP address in the administration information with the IP address of the received device IP address-containing information, in case administration information including the same MAC address as that in the received device IP address-containing information and a different device IP address from that in the device IP address-containing information is stored in the administration storage.

(3) The network system according to claim 1, wherein the administration information storage stores the administration information including an administration name presented to a user as identification information of a network device, and the administration information adding unit stores into the administration storage the administration information including an administration name generated from a MAC address and a model name in the device IP address-containing information corresponding to the received device IP address-containing information, in case the administration information containing the same MAC address as that in the received device IP address-containing information is not stored in the administration information storage.

That is, the network system according to the invention is a system including a combination of a network device having a feature to transmit device IP address-containing information including the IP address of the device at power on and an administration device having a feature to automatically register administration information concerning a network device which has transmitted the device IP address-containing information (storing the information into the administration information storage) based on the device IP address-containing information. Thus, the network system is ready for operation when the IP address is set to the network device, or a system which does not require IP address setting to an administration device.

With this configuration, it is possible to acquire a network system which does not require an administrator to determine an administration name presented to the user as identification information concerning each network device.

DETAILED DESCRIPTION OF PREFERRED EMBODIMENTS

The best embodiments of the invention will be described referring to drawings.

The configuration of a network system according to the invention will be described referring to FIGS. 1 through 3.

Figure 1:
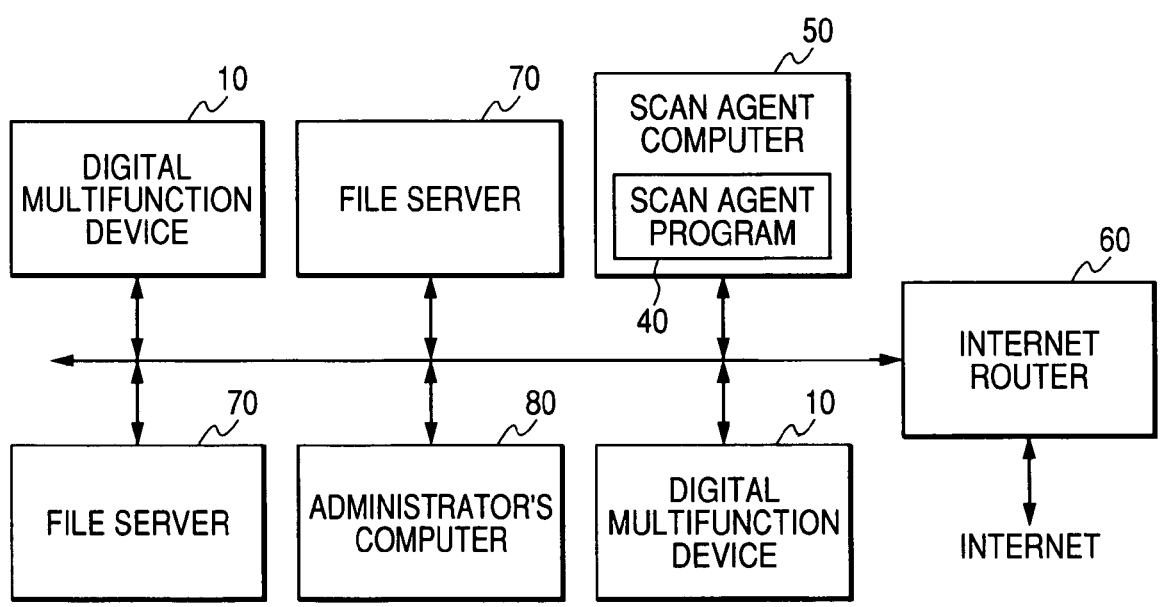
FIG. 1 is a block diagram of a network system according to an embodiment of the invention.

As shown in FIG. 1, the network system according to this embodiment is a system in which one or more (two in FIG. 1) digital multifunction devices 10 (corresponding to a network device of the invention), a scan agent computer 50 (corresponding to a administration device of the invention), an internet router 60, multiple file servers 70 and an administrator's computer 80 are interconnected via a network.

The internet router 60 is a device for connecting each computer in the network system to the Internet. The fileserver 70 is a computer to which is set a folder which allows file writing. The administrator's computer 80 is a computer used by the administrator of the network system (a computer in which a web browser is installed).

The scan agent computer 50 is a computer in which a scan agent program 40 developed for the digital multifunction device 10 is installed.

Figure 2:
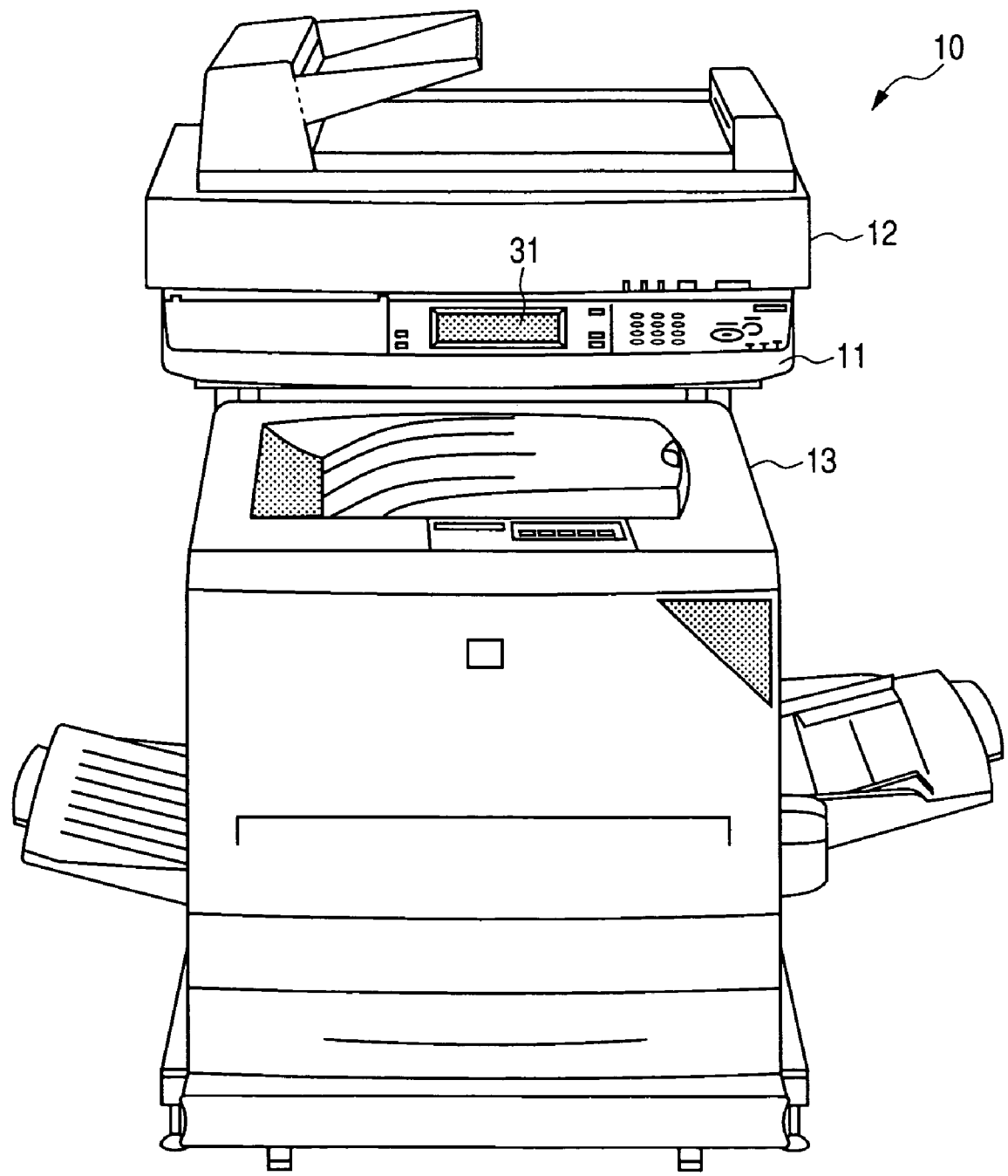
FIG. 2 is an external view of a digital multifunction device included in the network system according to the embodiment.
Figure 3:
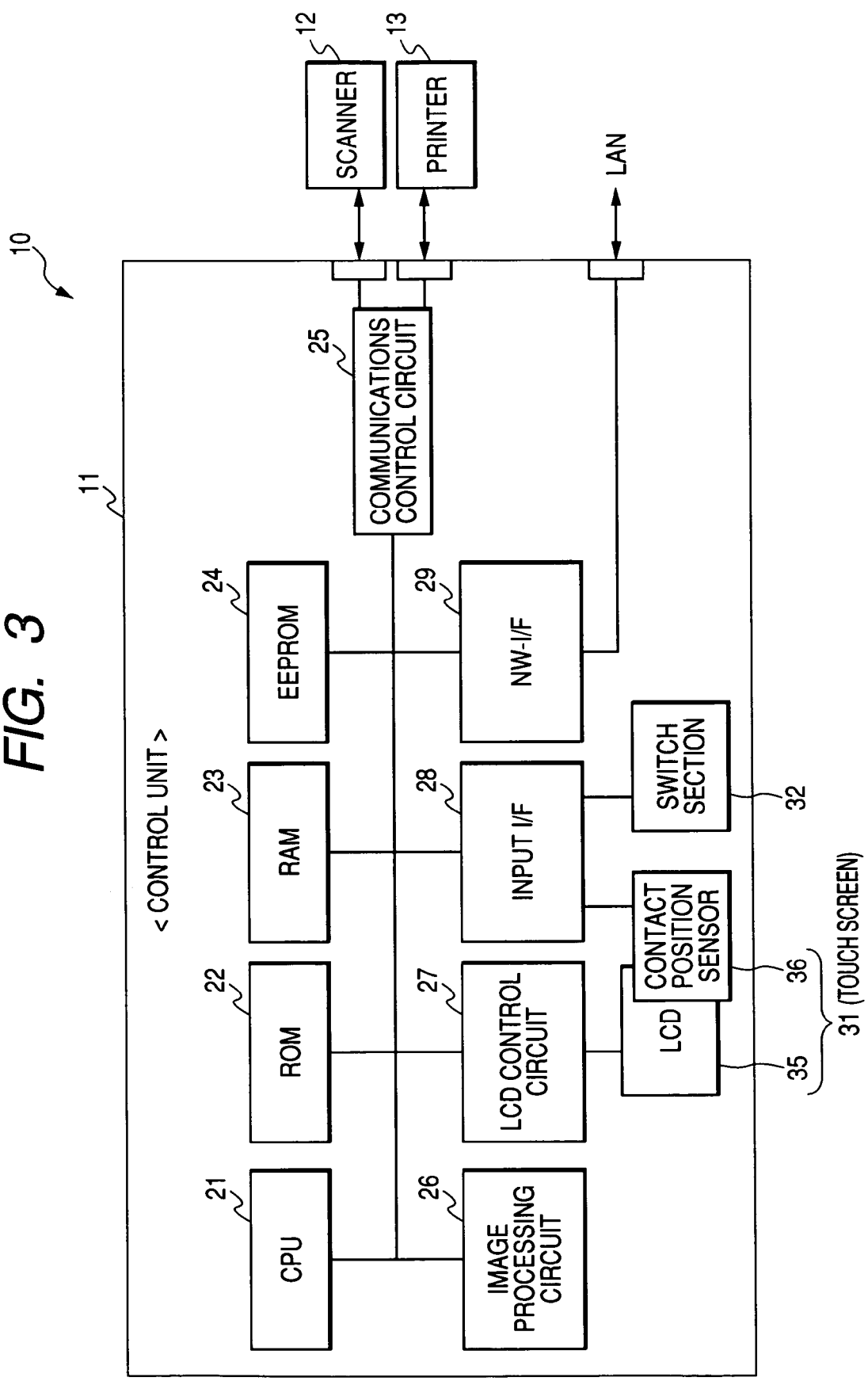
FIG. 3 is a block diagram of a digital multifunction device according to the embodiment.

The digital multifunction device 10 is a device which has an external appearance and a hardware configuration respectively shown in FIG. 2 and FIG. 3. The digital multifunction device 10 is a device as a combination of a control unit 11, a scanner 12 and a printer 13 so as to have the same external appearance as a general digital multifunction device/copier (refer to FIG. 2).

The printer 13 of the digital multifunction device 10 is a printer available as a peripheral device of a computer with an extension board attached for implementing the digital multifunction device 10, that is, for connecting the control unit 11 and the printer 13. The scanner 12 is a scanner available as a peripheral device of a computer with an extension board attached for implementing the digital multifunction device 10, that is, for connecting the control unit 11 and the scanner 12.

The control unit 11 is a unit for performing processing to operate the digital multifunction device 10 (the scanner 12, the printer 13 and the unit 11) as a copier, and processing to cause a system comprising the digital multifunction device 10 and the scan agent computer 50 to perform scan data transmission processing, that is, processing of creating the image data of a manuscript set to the scanner 12 into a file and storing the file into a specified file server 70 and processing of transmitting to a specified destination an e-mail to which the image data of the manuscript set to the scanner 12 is attached.

As shown in FIG. 3, the control unit 11 comprises a CPU 21, a ROM 22, a RAM 23, an EEPROM 24, a communications control circuit 25, an image processing circuit 26, an LCD control circuit 27, an input interface circuit (input I/F) 28, a network interface circuit (NW-I/F) 29, a touch screen 31, and a switch section 32.

The touch screen 31 of the control unit 11 is a device comprising a liquid crystal display (LCD) 35 on which a transparent contact position sensor 36 is provided. The switch section 32 is a unit comprising various pushbutton switches and a ken-key pad provided on the enclosure of the control unit 11 and a control circuit for these switches.

The CPU 21 is a control circuit for integrally controlling each section of the digital multifunction device 10 (each section of the control unit 11, the scanner 12 and the printer 13). The ROM 22 is a read-only memory in which is recorded data used by a program which specifies the operation procedure of the CPU 21 and the CPU 21 or various programs. The RAM 23 is a memory from which a program recorded in the ROM 22 is read and also a memory used as a work area for the CPU 21 (or various programs). The communications control circuit 25 is a circuit used by the CPU 21 to communicate information to/from the scanner 12 or the printer 13, for example transmitting commands, receiving image data, and transmitting print data. The image processing circuit 26 is a circuit for performing various types of image processing on the image data generated by the scanner 12.

The LCD control circuit 27 is a circuit which causes the touch screen 31 (LCD 35) to display an image (screen) instructed by the CPU 21. The input interface circuit 28 is a circuit for communicating the operation of the user (operator of the digital multifunction device 10) on the ten-key pad 32 or the touch screen 31 (contact position sensor 36) to the CPU 21. The network interface circuit 29 is a circuit for connecting the control unit 11 to a LAN.

The EEPROM 24 is a nonvolatile memory mounted on the control unit 11 so as to store various information such as the IP address of the device and IP address of the scan agent computer 50) which must be retained even when the power is turned off.

The features of the digital multifunction device 10 (control unit 11) and the scan agent program 40 as well as the procedure to be followed by the administrator (person who performs initial setting) at the start of operation of this network system (initial setting of the digital multifunction device 10) will be described.

The scan agent program 40 is so-called a resident program. The procedure to be followed by the administrator at the start of operation of this network system is only the procedure of causing a computer used as a scan agent computer 50 (to which an IP address has been set) to execute a setup program for the scan agent program 40.

With the procedure, a computer in which the scan agent program 40 is installed (that is, the scan agent computer 50) starts operation as a sort of web server and a device to respond to a scan data processing request and an IP address registration/acknowledgment request (detailed later) from the digital multifunction device 10.

When the operation of the network system is started, the administrator carries out a procedure of setting an IP address by operating the buttons and the touch screen on the control unit 11 of the digital multifunction device 10 as well as a procedure of setting the IP address of the agent computer 50 to the digital multifunction device 10. When this procedure is complete, the IP address of the digital multifunction device 10 (hereinafter referred to as the device IP address) and the IP address of the agent computer 50 (hereinafter referred to as the agent IP address) set by the administrator are stored into the EEPROM 24 (corresponding to the IP address storage of this invention).

The control unit 11 according to this embodiment is designed to transmit, in case a device IP address and an agent IP address are stored in the EEPROM 24 or the device IP address and the agent IP address have been changed at power on, an IP address registration/acknowledgment request comprising information indicating the device IP address, the MAC address of the unit (network interface circuit 29), the model name of the unit, the model name of the scanner 12 and attachment of an optional device (ADF) of the scanner 12, to a device identified by the agent IP address stored in the EEPROM 24. The section in charge of this operation in the control unit 11 corresponds to the device IP address-containing information transmitter of the invention. The IP address registration/acknowledgment request corresponds to the device IP address-containing information of the invention.

Figure 4:
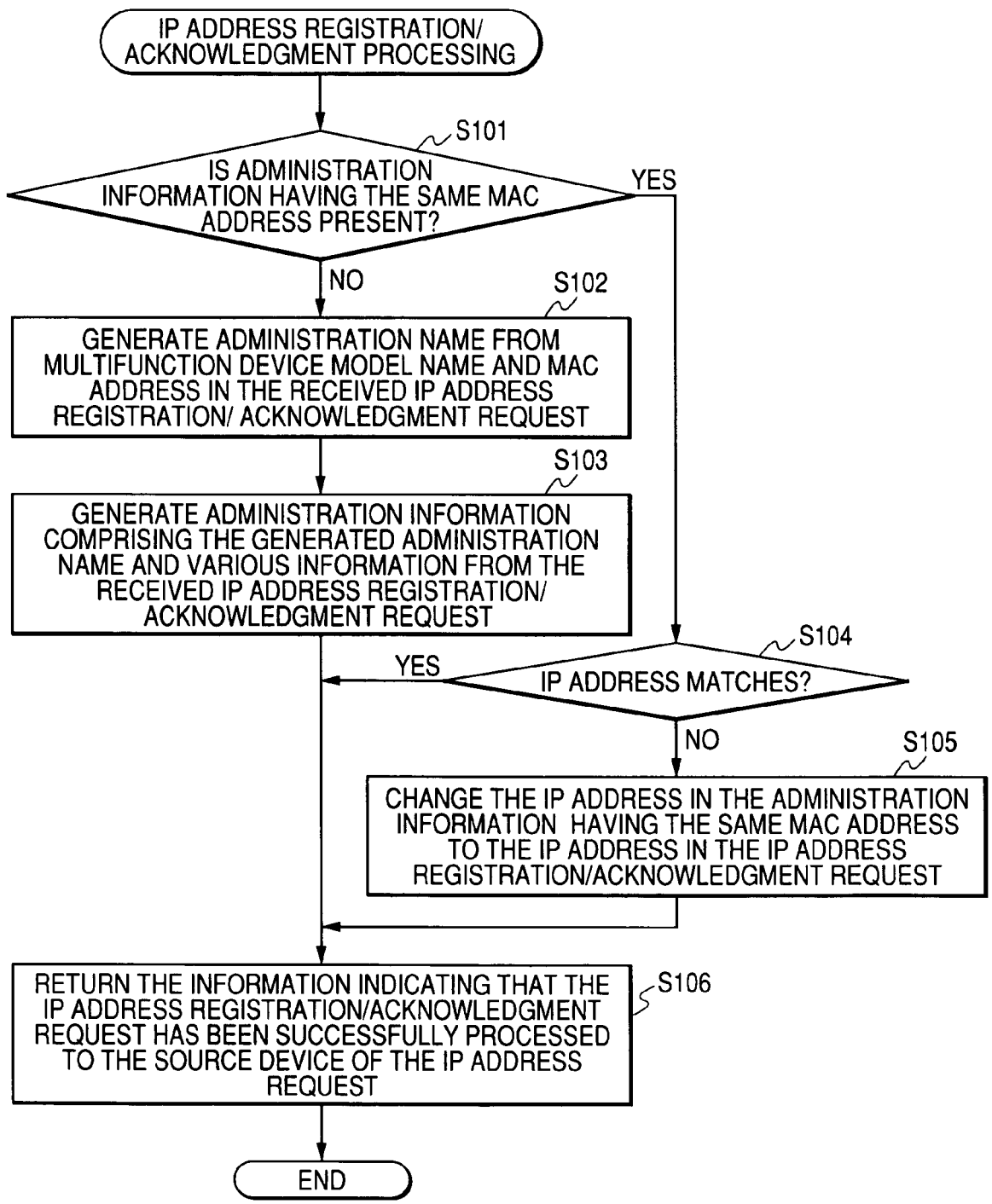
FIG. 4 is a flowchart of IP address registration/acknowledgment processing executed by the digital multifunction device (control unit).

The scan agent program 40 is a program which causes the scan agent computer 50 to execute the IP address registration/acknowledgment processing in the procedure shown in FIG. 4, on reception of the IP address registration/acknowledgment request.

The scan agent computer 50, receiving the IP address registration/acknowledgment request, determines whether the administration information corresponding to the IP address registration/acknowledgment request is stored in the computer (in a predetermined folder in the HDD of the computer) (step S101). The administration information comprises an administration name generated by the scan agent computer 50 from a model name of the control unit 11 included in the IP address registration/acknowledgment request (model name of the multifunction device in FIG. 4) and part of a MAC address, as well as information including each information item included in the IP address registration/acknowledgment request (information stored into the scan agent computer 50 by way of the processing in step 103 described later). The administration information corresponding to the received IP address registration/acknowledgment request refers to the administration information including the same MAC address as that included in the received IP address registration/acknowledgment request.

In case the administration information corresponding to the received IP address registration/acknowledgment request is not stored in the computer (step S101; NO), the scan agent computer 50 generates an administration name by combining the model name of the control unit 11 and part of the MAC address included in the IP address registration/acknowledgment request (step S102). Then the scan agent computer 50 generates the information including the generated administration name and each information item included in the received IP address registration/acknowledgment request and stores the resulting information into the computer (step S103: corresponding to the operation on administration information adding unit). The actual processing in step S102 is processing to generate a character string as an administration name comprising the model name of the control unit 11 followed by the last four letters of the MAC address. The actual processing in step S103 is processing to generate a folder having the same folder name as that of the MAC address under a predetermined folder (corresponding to the administration information storage) created on the HDD and creating an administration information file in the created folder.

Having generated and stored the administration information (step S103), the scan agent computer 50 returns the information indicating that the IP address registration/acknowledgment request has been successfully processed to the source device (digital multifunction device 10/control unit 11) of the IP address registration/acknowledgment request (step S106). The scan agent computer 50 completes the IP address registration/acknowledgment processing.

In case the information corresponding to the received IP address registration/acknowledgment request is stored in the computer (step S101; NO), the scan agent computer 50 determines whether the device IP address included in the administration information matches the device IP address included in the received IP address registration/acknowledgment request (step S104). In case both IP addresses match each other (step S104; YES), the scan agent computer 50 executes step S106 and the subsequent steps. In case the both IP addresses do not match each other (step S104; NO), the scan agent computer 50 changes the device IP address having the same MAC address as that but a different device IP address from that in the received IP address registration/acknowledgment request to the device IP address included in the IP address registration/acknowledgment request step S105: corresponding to the operation on administration information adding unit). Then the scan agent computer 50 executes step S106 and the subsequent steps.

The scan agent program 40 is a program which causes the scan agent computer 50 to execute the IP address registration/acknowledgment processing as well as various types of processing using the administration information stored in the computer by way of the IP address registration/acknowledgment processing.

Figure 5:
FIG. 5 illustrates the procedure to be followed by the administrator at the start of operation of the network system according to the invention.

For example, the scan agent computer 50 (scan agent program 40), receiving a predetermined HTTP request, causes the computer which has transmitted the HTTP request to display a web page shown in FIG. 5. Note that "AL-CCS900" in FIG. 5 is the model name of the control unit 11 and "AL-CCS9000E042" is the administration name generated by the scan agent program 40 from the model name of the control unit 11 and the MAC aggress.

The scan data processing request is a request (information) transmitted by the digital multifunction device 10 on which the user has instructed start of scan data processing to the scan agent computer (device having an agent IP address stored in the EEPROM 24) 50.

The scan agent computer 50, receiving the scan data processing request, determines whether the administration information including the same device IP address as the IP address concerning the source device of the scan data processing request is present in the computer. The scan agent computer 50, only in case such administration information is present in the computer, performs processing to actually responding to the received scan data processing request, that is, processing of storing an image data file transmitted from the digital multifunction device 10 into the file server 70 and transmitting an e-mail to which the image data file is attached. The section in charge of this operation in the scan agent computer 50 corresponds to the specific-target processor of the invention.

Figure 6:
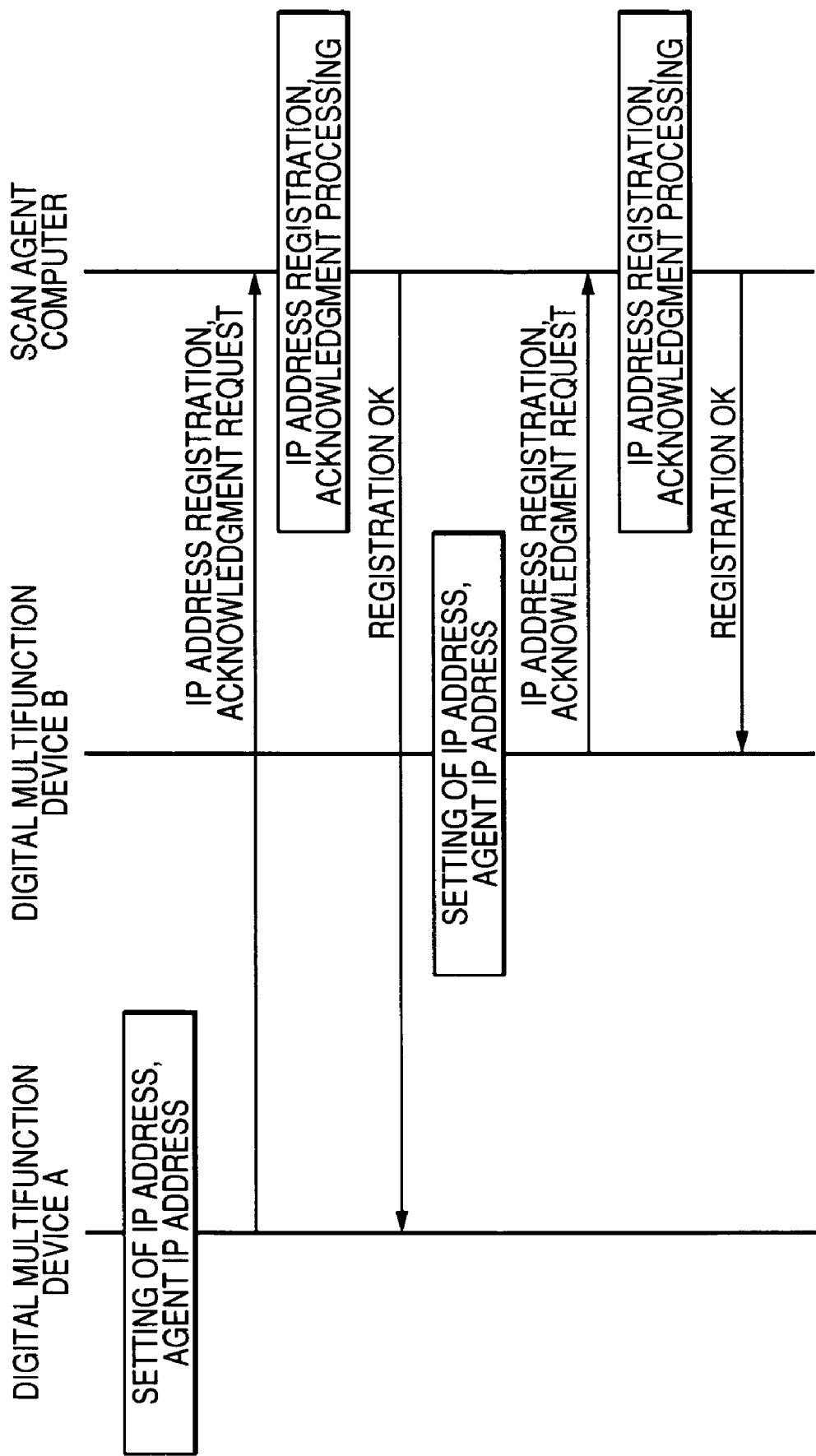
FIG. 6 illustrates a web page which a scan agent computer according to this embodiment can offer to another computer.
Figure 7:
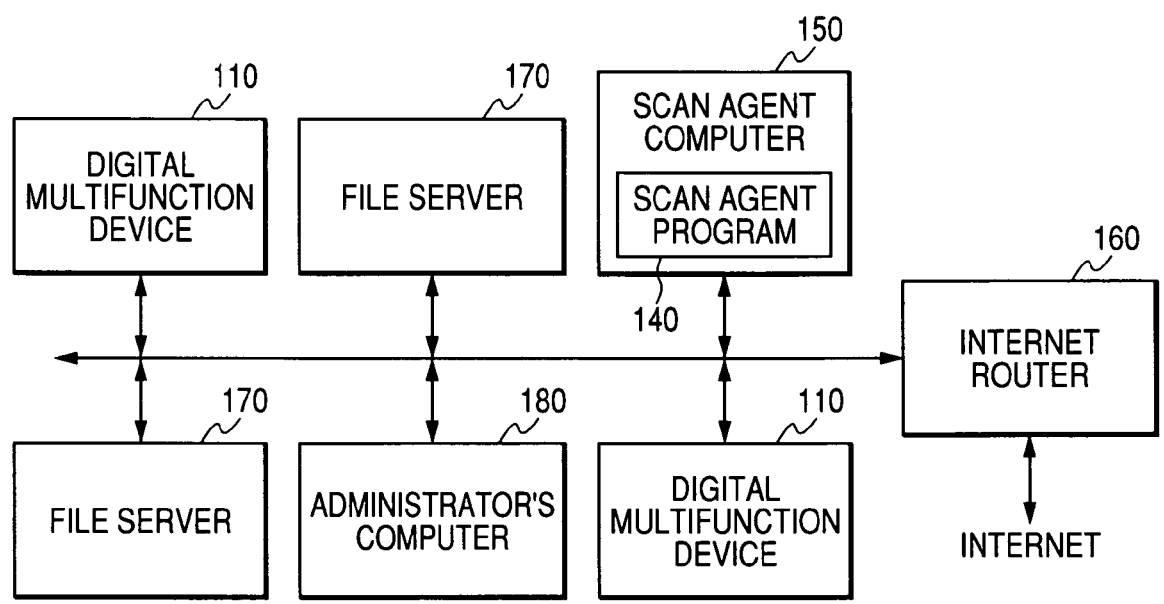
FIG. 7 is a block diagram of a related art network system.
Figure 8:
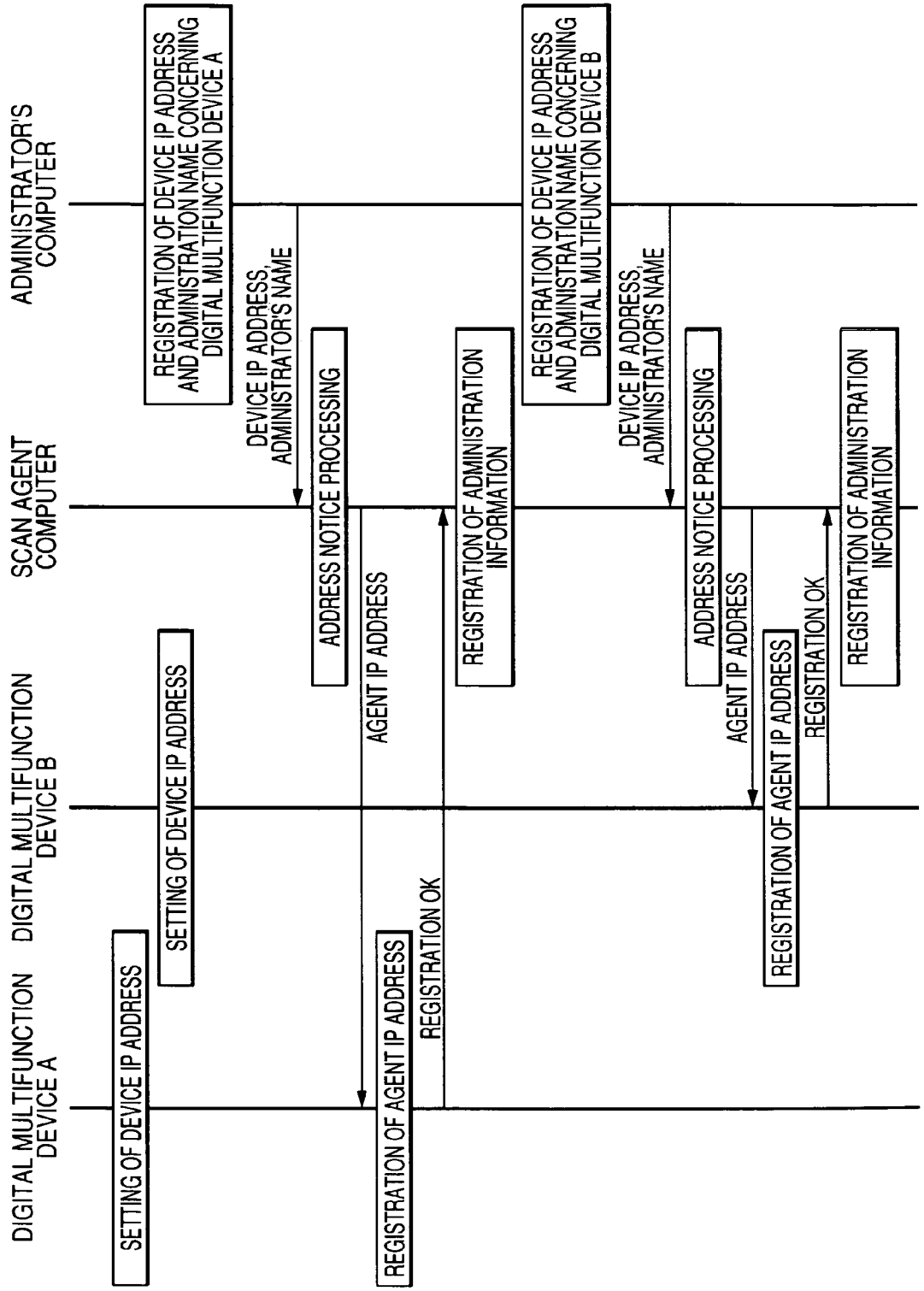
FIG. 8 illustrates the procedure to be followed by the administrator at the start of operation of the network system according to the elated art.

As mentioned hereinabove, the network system according to the invention comprises a digital multifunction device 10 having a feature to transmit an IP address registration/acknowledgment request including an IP address, a MAC address and a model name concerning the device at power on and a scan agent computer 50 having a feature to automatically register administration information concerning the digital multifunction device 10 which has transmitted the device IP address registration/acknowledgment request based on the received device IP address registration/acknowledgment request. Thus, as schematically shown in FIG. 6, the network system according to this embodiment functions as a system in which the administrator must set a device IP address and an agent IP address to each digital multifunction device (Digital Multifunction Device A and Digital Multifunction Device B in the figure) of the system, that is, a system which does not require setting to the scan agent computer 50).

The scan agent computer 50 also has a feature to change, in case it has received an IP address registration/acknowledgment request including the same MAC address as that but a different IP address from that in the already registered administration information, the IP address in the administration information to the IP address in the received IP address registration/acknowledgment request (refer to FIG. 4: steps S101, S104, S105). Thus, in the network system according to the invention, only the IP address of the digital multifunction device 10 must be changed even in case it is necessary to change the IP address of the digital multifunction device 10.

The scan agent computer 50 also has a feature to automatically generate an administration name from the information in the received IP address registration/acknowledgment request. Thus, the network system according to this embodiment is a system which allows easier installation of each digital multifunction device 10 than a related art network system, because the administrator need not determine the administration name of each digital multifunction device 10.

Variation

Variation of the network system is possible in various ways. For example, in case a MAC address is presented to the user as the identification information of each digital multifunction device 10, a feature to automatically generate an administration name may be removed from the scan agent computer 50 (scan agent program 40). While the network system is used by the scan agent computer 50 in order to perform scan data transmission processing, the network system may be used for a technology employed in the network system to implement a network system comprising a plurality of network devices whose initial purpose is different from that of the digital multifunction device 10 and an administration device which requires setting of the IP address of each of the network devices.

What is claimed is:

1. A network system in which an administration device and one or more network devices are interconnected via a network, wherein each of the one or more network devices comprises:

an IP address storage that stores an administration device IP address as an IP address of the administration device set to the device, and an device IP address as an IP address of the device; and a device IP address-containing information transmitter that, when the device is powered, transmits device IP address-containing information, which include the device IP address and other information concerning the device stored in the IP address storage, to a device to which the administration device IP address stored into the IP address storage is assigned, and wherein the administration device comprises:

an administration information storage that is capable of storing a plurality of administration information items including the device IP address;

administration information adding unit that stores administration information corresponding to the received device IP address-containing information into the administration information storage in the case that the administration information corresponding to the device IP address-containing information is not stored in the administration information storage when the device IP address-containing information is received; and a specific-target processor that performs predetermined processing on the network device alone to which the device IP address included in each administration information item stored in the administration storage is assigned.

2. The network system according to claim 1, wherein the device IP address-containing information transmitter transmits the device IP address-containing information including the device IP address, a MAC address of the device, and a model name of the device, the administration information storage transmits administration information including the device IP address, the MAC address and the model name included in the device IP address-containing information, and the administration information storage stores the administration information corresponding to the received device IP address-containing information into the administration information storage, in case the administration information containing the same MAC address as that in the received device IP address-containing information is not stored in the administration information storage, and overwrites the device IP address in the administration information with the IP address of the received device IP address-containing information, in case administration information including the same MAC address as that in the received device IP address-containing information and a different device IP address from that in the device IP address-containing information is stored in the administration storage.

3. The network system according to claim 1, wherein the administration information storage stores the administration information including an administration name presented to a user as identification information of a network device, and the administration information adding unit stores into the administration storage the administration information including an administration name generated from a MAC address and a model name in the device IP address-containing information corresponding to the received device IP address-containing information, in case the administration information containing the same MAC address as that in the received device IP address-containing information is not stored in the administration information storage.

* * * * *